US008633612B2

(12) United States Patent
Bodnar

(10) Patent No.: US 8,633,612 B2
(45) Date of Patent: Jan. 21, 2014

(54) SIGNAL VARIANCE SENSING POWER CONTROLLER

(75) Inventor: Eric Bodnar, San Francisco, CA (US)

(73) Assignee: Velvetwire, LLC, San Francisco, CA (US)

( * ) Notice: Subject to any disclaimer, the term of this patent is extended or adjusted under 35 U.S.C. 154(b) by 305 days.

(21) Appl. No.: 12/721,487

(22) Filed: Mar. 10, 2010

(65) Prior Publication Data

US 2011/0221271 A1    Sep. 15, 2011

(51) Int. Cl.
    *H02J 3/14*    (2006.01)
(52) U.S. Cl.
    USPC ............................................. 307/31
(58) Field of Classification Search
    USPC ........................................ 307/31; 713/300
    See application file for complete search history.

(56) References Cited

U.S. PATENT DOCUMENTS

| | | | |
|---|---|---|---|
| 4,516,213 A | 5/1985 | Gidden | |
| 4,706,882 A | 11/1987 | Barnard | |
| 5,088,645 A | 2/1992 | Bell | |
| 5,127,575 A | 7/1992 | Beerbaum | |
| 5,165,465 A | 11/1992 | Kenet | |
| 5,344,068 A | 9/1994 | Haessig | |
| 5,395,042 A | 3/1995 | Riley et al. | |
| 5,563,455 A | 10/1996 | Cheng | |
| 5,821,924 A | 10/1998 | Kikinis et al. | |
| 6,108,614 A | 8/2000 | Lincoln et al. | |
| 6,263,260 B1 | 7/2001 | Bodmer et al. | |
| 6,375,087 B1 | 4/2002 | Day et al. | |
| 6,586,849 B2 | 7/2003 | Tarr | |
| 7,132,763 B2 * | 11/2006 | Rendic | 307/31 |
| 7,193,335 B2 * | 3/2007 | Palmer et al. | 307/39 |
| 7,622,822 B2 | 11/2009 | Gelonese | |
| 2003/0009401 A1 | 1/2003 | Ellis | |
| 2003/0073342 A1 * | 4/2003 | Geyer | 439/489 |
| 2006/0182458 A1 * | 8/2006 | Hall et al. | 399/88 |
| 2007/0053513 A1 | 3/2007 | Hoffberg | |
| 2008/0046387 A1 | 2/2008 | Gopal et al. | |
| 2008/0106148 A1 | 5/2008 | Gelonese | |
| 2008/0261453 A1 * | 10/2008 | Chen | 439/620.08 |
| 2009/0052372 A1 | 2/2009 | Durazzo et al. | |
| 2009/0100275 A1 * | 4/2009 | Chang et al. | 713/300 |

(Continued)

FOREIGN PATENT DOCUMENTS

WO    WO 2008/064410 A1    6/2008

OTHER PUBLICATIONS

PCT/US2011/027301, International Search Report and Written Opinion, mailing date Apr. 28, 2011, 11 pages.
Embertec Honored in CES 2010 Innovations Awards!, Dated Oct. 22, 2009, http://www.embertec.com/default.asp?PageID=9&ReleaseID=13&Display=True, 2 pages.

(Continued)

*Primary Examiner* — Jared Fureman
*Assistant Examiner* — Alfonso Perez Borroto
(74) *Attorney, Agent, or Firm* — Blakely, Sokoloff, Taylor & Zafman, LLP; Judith A. Szepesi

(57) ABSTRACT

A signal variance sensing power controller is described. The power controller functions by measuring the power consumption of a first device, and detecting fluctuations in the power consumption. The power controller then determines a level of variability, based on measured changes in the first device. Based on the level of variability, the power controller then determines a state of the first device, and influences a second device based on that state.

22 Claims, 15 Drawing Sheets

(56) References Cited

U.S. PATENT DOCUMENTS

| | | |
|---|---|---|
| 2009/0235107 A1 | 9/2009 | Gelonese |
| 2009/0289501 A1* | 11/2009 | Garb .............................. 307/39 |
| 2010/0095146 A1 | 4/2010 | Gelonese |
| 2010/0231043 A1* | 9/2010 | Hu ................................. 307/39 |
| 2011/0216452 A1* | 9/2011 | Haines et al. .................. 361/42 |

OTHER PUBLICATIONS

Embertec Products, Accessed Apr. 29, 2010, http://www.embertec.com/default.asp?PageID=6&n=Power+Saving+Technologies+2D+Products, 2 pages.

PCT/US2011/027301, International Preliminary Report on Patentability, Date of Mailing Apr. 9, 2012, 27 pages.

\* cited by examiner

SIGNAL VARIANCE SENSING POWER CONTROLLER

FIELD OF THE INVENTION

The present invention relates to power controllers, and more particularly to a power controller to reduce energy waste due to wasted standby power.

BACKGROUND

A combination of increasing energy costs and increased environmental awareness has led to a desire by individuals and businesses to curb energy waste. One particular area of energy waste that has attracted attention is the area of wasted standby power, sometimes known as vampire or phantom power. Most modern appliances no longer completely shut off but, instead, enter into a standby power state. In this state, these appliances wait for an event, such as an infrared remote signal, a time trigger or a push of a button, to return to a full power state. Computer monitors, printers, connection hubs, televisions, amplifiers, DVD players, game consoles and many other common appliances all exhibit this behavior.

Because these appliances spend the majority of their operational life in standby, aggregate power consumption in standby is often significantly greater than the power used when the devices are actually in use. And since such devices are common, estimates suggest that between 10% and 20% of the modern electrical budget is consumed by appliances in standby, waiting to be used. Standby power waste has grown significantly in the last decade and expected to increase into the future as more devices upgrade to using a standby mode to enable them to "turn on" instantly.

Shutting off appliances manually, or unplugging them when not in use, is neither convenient nor practical. In many cases, master power switches are hidden in difficult to access areas and the outlets into which these appliances are plugged are often inaccessible. Furthermore, there may be many such appliances in a single home or office.

The growing popularity of personal computers, particularly laptop computers, has created a significant standby power problem. Appliances used in conjunction with computers and laptops, such as printers, hubs, monitors and speakers, often remain on, perpetually waiting for the laptop to be connected. Even though these appliances are not in use, often for extended periods of time, they continue to consume power.

One prior art solution to this problem is a current sensing automatic shut-off apparatus. One example of a prior art mechanism of this type is a traditional multi-outlet power strip with a combination of a current measuring outlet and one or more controlled outlets. The current measuring outlet is permanently powered and measures the current draw of the attached "measured" appliance, a personal computer or television, for example. The controlled outlet(s) are attached to an automatic electrical disconnection device, which connects to or disconnects from power depending on the amount of current measured at the current measuring outlet. Using such an apparatus, "controlled" appliances, such as amplifiers, printers, hubs and DVD players, can be fully de-powered whenever the measured appliance goes into standby mode and then re-powered when the primary appliance is returns to normal operation mode. Such a mechanism can reduce the amount of standby draw from that of many appliances to that of the single appliance, thereby saving significant energy.

The simplest types of these current-measuring mechanisms use analog circuitry to measure current consumed through the current measuring outlet and use the results of the measurement to trigger the control outlet(s). Specifically, control outlet(s) are powered whenever the current measured at the current measuring outlet exceeds a pre-set threshold. In some instances the threshold is fixed. In others it can be adjusted using a tunable potentiometer. These mechanisms work reasonably well for measured appliances that fit pre-determined criteria. However, these mechanisms can become unstable if the transition of the measured appliance from standby to in-use occurs at a current value at or near the pre-set trigger threshold. In such a scenario, these mechanisms tend to power and de-power the control outlet(s) repeatedly and rapidly, which can damage appliances attached to the control outlet(s).

Another prior art mechanism uses a digital controller to calibrate the trigger threshold in order to avoid the instability problem introduced by a pre-set threshold. In this prior art system, the mechanism measures the maximum current draw during operation of the appliance attached to the current measuring outlet and uses this measurement to determine a trigger threshold. Even using a simple formula, such as percentage of maximum measured current, to calibrate the trigger threshold avoids the problem of malfunction possible with a pre-set threshold. However, the digital prior art system functions on the assumption that the appliance being measured operates in two distinct power modes, a lower current standby mode and a higher current active mode. This assumption is reasonably valid for appliances such as television sets and even some desktop computers. However, many appliances, particularly re-chargeable appliances such as laptop computers, exhibit complex power consumption behavior and will completely confuse such a mechanism.

SUMMARY

A signal variance sensing power controller is described. The power controller functions by measuring the power consumption of a first device, and detecting changes in the power consumption over time. The power controller then determines a level of variability, based on the detected changes, and, from this level of variability, determines a profile of the first device and, based on the mode, influences the second device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is to provide a signal variance sensing power controller that can be used with a first device, to reduce wasted standby power consumption by associated devices. The system analyzes the complex energy consumption profiles of modern devices such as laptops, and from the analysis, determines the operating mode of the primary device. More specifically, such devices exhibit distinctly different energy consumption behavior when in use than when in other modes of operation, such as standby or charging. By tracking energy consumption and determining the pattern of energy consumption for various states, the system can ensure that other devices associated with the primary device are only drawing power when the primary device is in use, not when it is charging, hibernating, in stand-by, or in any of the various modes associated with not being in use.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims. Although the term "laptop" or "computer" is used in the present application, one of skill in the art would understand the applicability of the present invention to other modern appliances that have multiple operational modes, and which have associated devices—for example, a home theater system, a music system, gaming system, etc.

Figure 1:
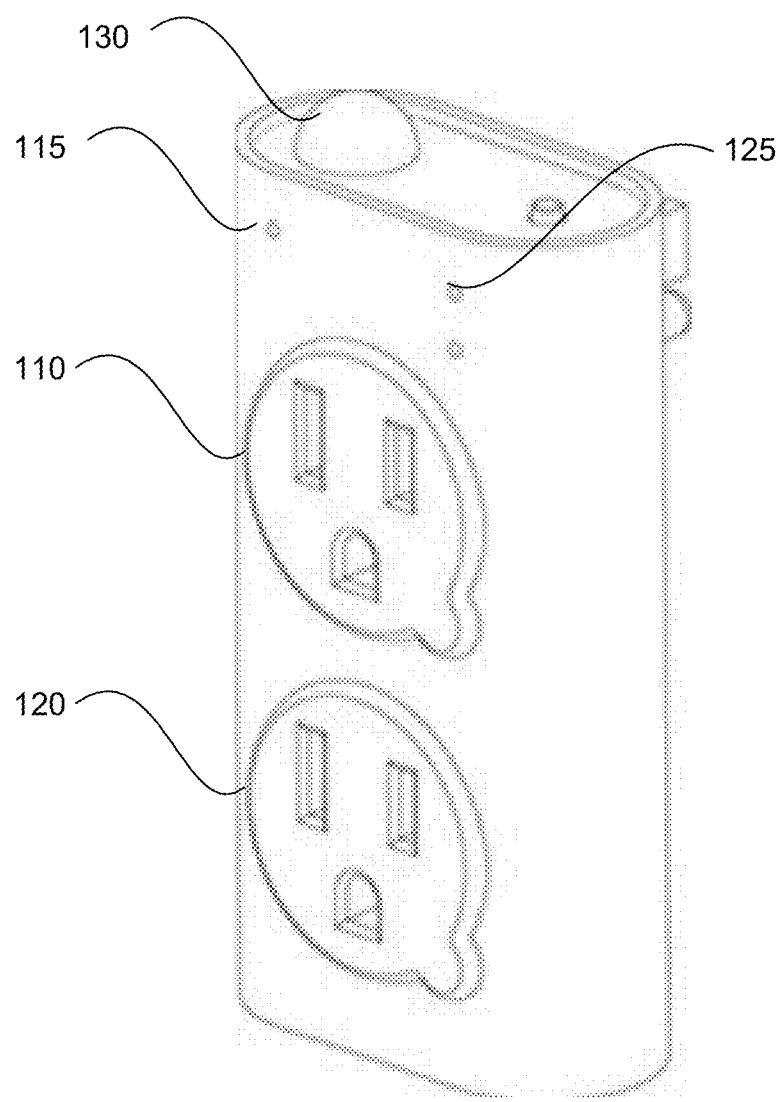
FIG. 1 illustrates an exemplary design for a variance sensing signal controller.

FIG. 1 illustrates an exemplary variance sensing signal controller. The example in FIG. 1 is for illustrative purposes only. Two plugs are shown, one of which is the sensing outlet 110, and the other is the controlled outlet 120. In one embodiment, the top outlet is the sensing outlet 110, and the bottom outlet is the controlled outlet 120. In one embodiment, a power strip may be plugged into either the sensing or the controlled outlet, without altering the way the system works. In one embodiment, if there is a power strip in the sensing outlet, the outlets on the strip are "OR-ed" so that a device in any of the outlets of the power strip would let the system function.

In one embodiment, there is a feedback element, such as a LED (light emitting diode) 115, 125, associated with each outlet, or each type of outlet. The LED 115, 125 in one embodiment provides information about the state of the outlet, e.g. surge protection active, surge protection failed, outlet is properly grounded, etc. In one embodiment, the LED 115, 125, 130 provides feedback on the state of the monitored device (e.g. disconnected, off, charging, in use). In one embodiment, an LED 115, 125, or 130 provides feedback about the device state using a blink rate, color, or other indicator. In one embodiment, an LED 115, 125, or 130 provides feedback indicating the fluctuations in the power consumption.

In one embodiment, one or more of the LEDs 115, 125, 130 may be multi-color LED, or may include multiple LEDs. In one embodiment, the LEDs 115, 125, 130 provide feedback on the state of the controlled outlet (e.g. powered or de-powered). In one embodiment, a first LED 115 provides information about whether the surge protection is still active, a second LED 125 provides information about whether the outlet is plugged into ground, and a third LED 130 provides information about the device state plugged into the sensing outlet.

Many alternative physical embodiments, which employ these systems, are possible. Alternative embodiments may include multiple sensing outlets, multiple controlled outlets, and non-affected outlets. In one embodiment, multiple sensing outlets may be OR'ed, or AND'ed. In one embodiment, the detection on the sensing outlet may be used to trigger another action, rather than power a controlled outlet. Such actions may include, in one embodiment, activation or inactivation of IR transmitters, audio transmitters, radio frequency transmitters, or other actions, visual or auditory outputs, or the use of a warning systems based on the detected use of the master outlet. In one embodiment, the variance sensing power controller may be integrated into the power supply of a device.

Figure 2:
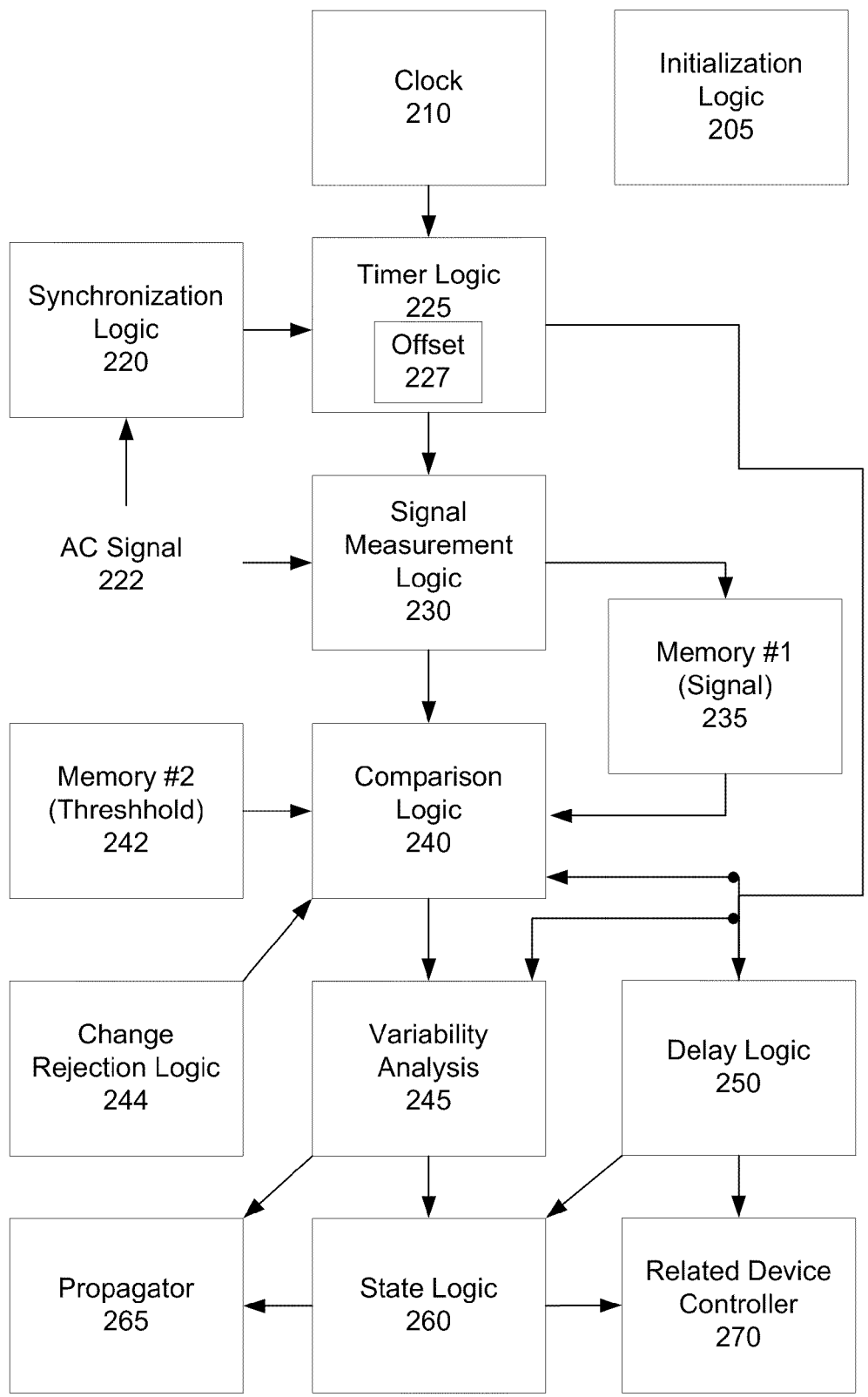
FIG. 2 is a block diagram of one embodiment of a variance sensing signal controller.

FIG. 2 is a block diagram of one embodiment of a variance sensing power controller. The AC signal 222 is the signal coupled to the main sensing outlet. Note that the term "outlet" applies to any electrical input, plug, or pluggable device, whose AC signal, as used, can be measured.

The system includes a timer logic 225 which is designed to provide timing for measurements of the AC signal 222. In one embodiment, the timer logic 225 may be used to provide appropriate timing for connecting and disconnecting a related device controller 270, as well. In one embodiment, the timer logic 225 is coupled to a clock 210. In one embodiment, the clock may be a crystal clock with a frequency at least 4× the frequency of the AC signal 222. Timer logic 225 is synchronized with AC signal 222, by synchronization logic 220.

The output of timer logic 225 is used by measurement logic 230 to time the AC signal 222 measurement. In one embodiment, the signal measurement is an amplitude measurement at the time of maximum amplitude. In one embodiment, the signal measurement is at the time of both minimum and maximum amplitude. In one embodiment, offset logic 227 offsets the timing of the measurement logic 230 using input from timer logic 225, so that the measurement is made at a precise time reflecting an appropriate point in the AC signal 222. In one embodiment, the offset value used by offset logic 227 is determined based on testing. In another embodiment, it is based on known delays and phase shift associated with the hardware components used.

In another embodiment, measurement logic 230 may make multiple measurements during a cycle of AC signal 222. In one embodiment, the measurement logic 230 further records the measurements (e.g. amplitudes at multiple times during a cycle), and provides these timer recorded measurements of AC signal 222 to comparison logic 240. In one embodiment these measurements may be temporarily stored in a memory, such as memory 235. In another embodiment, the measurement logic 230 further calculates slope between multiple measurements. In yet another embodiment, measurement logic 230 further calculates a curve between multiple measurements.

The output of signal measurement logic 230 is compared by comparison logic 240 to a baseline. In one embodiment, the baseline comprises measurements recorded in memory 235. In one embodiment, comparison logic 240 compares amplitude. In one embodiment, comparison logic compares slope. In one embodiment comparison logic compares curve points. In one embodiment memory 235 contains previously recorded measurements. In one embodiment, memory 235 contains reference values or reference measurements.

Comparison logic 240 outputs the comparison result and reports changes to variability analysis 245. In one embodiment, the comparison logic 240 verifies with change rejection logic 244 before indicating a change. The change rejection logic 244 rejects changes outside the fluctuation criteria. In one embodiment, fluctuation criteria is a threshold from memory #2 242, to ensure that the difference between the measured values is above the threshold. In one embodiment, the fluctuation criteria is a slope differential. In one embodiment, the fluctuation criterion is a deviation from a reference curve. In one embodiment, the fluctuation criterion is elapsed time since the last reported change. In one embodiment, change rejection logic 244 uses timing from delay logic 250 to determine the elapsed time between opposing changes, thereby differentiating between sudden changes and gradual changes.

Variability analysis 245, in one embodiment, is triggered periodically by timer logic 225. Variability logic analyzes the output of comparison logic 240. In one embodiment, the output from comparison logic 240 is higher, lower, or no change (+1, −1, 0). In one embodiment, each of these outputs is determined based on a threshold of minimum change (e.g. a measurement change below a given threshold is considered "no change") using input from change rejection logic 244.

Variability analysis 245 determines whether the output, as provided by comparison logic 240, indicates that the state of the measured device is "in use." In one embodiment, the states that may be identified based on the variability analysis are: device not connected, device off, device charging, device charged, device idle, device in suspend mode, device in use. In another embodiment, the only states determined are "in use" and "not in use."

The variability analysis 245 output is used by state logic 260, to determine whether the current state should be changed. In one embodiment, if the state, as determined by the variability analysis, does not match the current state, the state logic 260 alters the state. In one embodiment, this occurs only after the new state has been in effect for a period, as indicated by delay logic 250.

When state logic 260 changes the state, in one embodiment, the information is passed to related device controller 270. Related device controller 270 changes the setting associated with the related device. In one embodiment, if the related device is a controlled outlet for a device associated with the measured device, the related device controller 270 is a relay to connect or disconnect the controlled outlet. In one embodiment, the timing of the connection/disconnection is adjusted using delay logic 250, to compensate for mechanical delay and to force the change to occur at the zero crossing of the AC signal. In one embodiment, related device controller 270 outputs a signal to cause the related device to change power state.

In one embodiment, the output of the state logic 260 is also passed to propagator 265. Propagator 265 sends a signal with the state information. In one embodiment, propagator 265 sends the signal to an output device, such as an LED, a wireless transmitter, or other user interface or communication feature. In one embodiment, propagator 265 further receives information from variability analysis 245. The propagator 265 may use this to provide feedback to the user via an LED or other output mechanism. For example, in one embodiment, an LED may indicate the level of variability in the power consumption.

The system includes initialization logic 205, which sets up initial state assumptions for state logic 260 and any stored information, such as stored amplitude in memory 235 and stored threshold in memory 242. In one embodiment, initialization logic also initializes clock 210. In one embodiment, reset logic 205 also initializes AC signal 222.

Figure 3A:
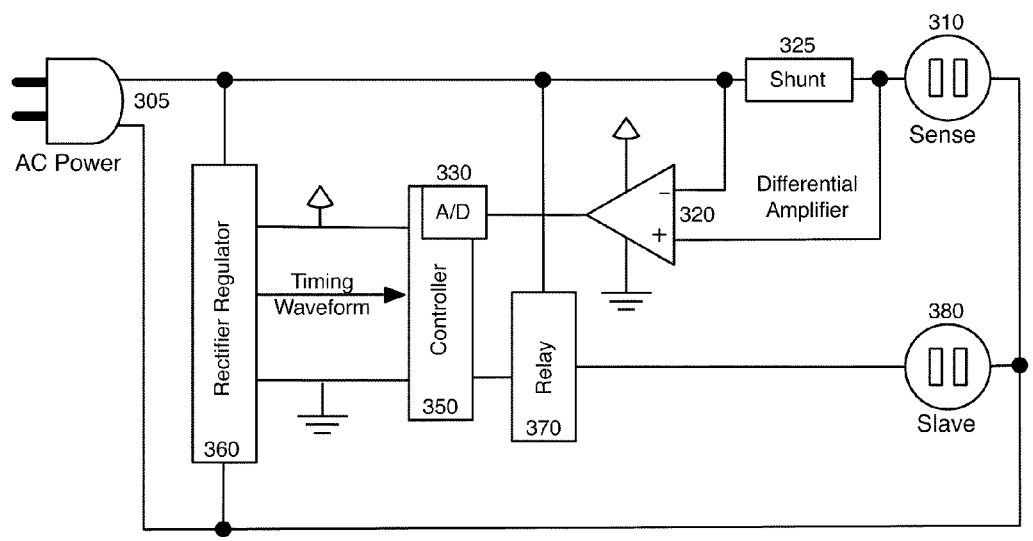
FIG. 3A illustrates a simplified circuit diagram of one embodiment of a variance sensing signal controller.

FIG. 3A illustrates a simplified circuit diagram of one embodiment of a variance sensing signal controller. An exemplary implementation combines a rectifier-regulator, a microcontroller, a signal measurement mechanism and a power control mechanism.

Figure 4A:
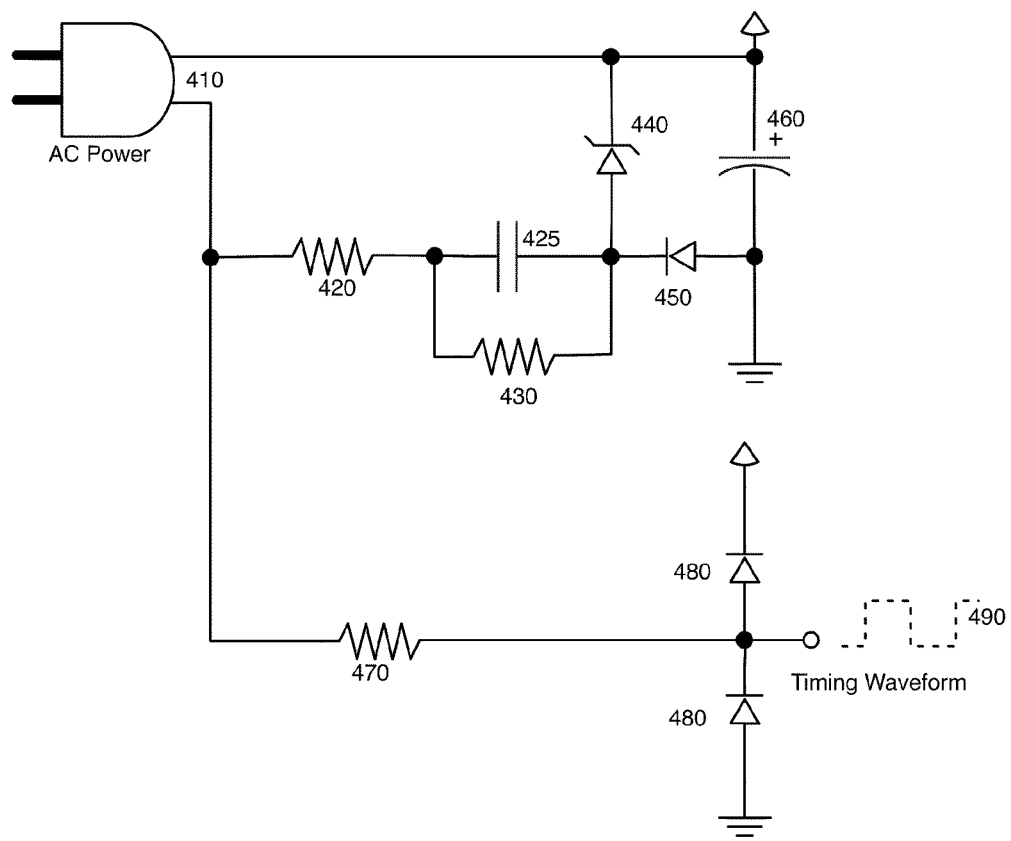
FIG. 4A illustrates one embodiment of circuit diagram for a DC rectifier regulator which may be part of a variance sensing signal controller.

A power source 305 provides power to the device as well as to any appliances attached to sensing outlet 310 or controlled outlet 380. Typically, for a North American implementation, this power source would be 120 Volts, 60 Hz AC (alternating current). Since the power source 305 cannot be fed directly to digital circuitry, rectifier-regulator block 360, one embodiment of which is shown in FIG. 4A, is used to convert the supplied power into suitable low-voltage DC (direct current). Additionally, rectifier-regulator block 360 supplies a digital timing waveform output to microcontroller block 350, which can be used to synchronize to the AC waveform of the supplied power.

An appliance attached to sensing outlet 310 is coupled to power source 305 through shunt 325. Any voltage drop across shunt 325 is measured, amplified and biased within digital voltage levels by differential amplification block 320. The output of differential amplification block 320 is a signal indicating the instantaneous power consumption of any appliance attached to sensing outlet 310. This signal is fed to an analog-to-digital (A/D) converter 330 within or connected to microcontroller block 350. Logic running within microcontroller block 350 can then read and perform computations using the described method.

Logic running within microcontroller block 350 incorporates timing information from rectifier-regulator block 360 with signal information from differential amplification block 320, to determine when to toggle relay 370. Relay 370 connects controlled outlet 380 and any attached appliances to power source 305 when triggered. Relay 370 isolates the controlled outlet 380 and any attached appliances from power source 305 when released.

Those skilled in the art will realize that the block diagram of FIG. 3A represents only one embodiment of a generalized digital measurement device attached to a power control mechanism. There are many ways to implement such a mechanism.

Figure 3B:
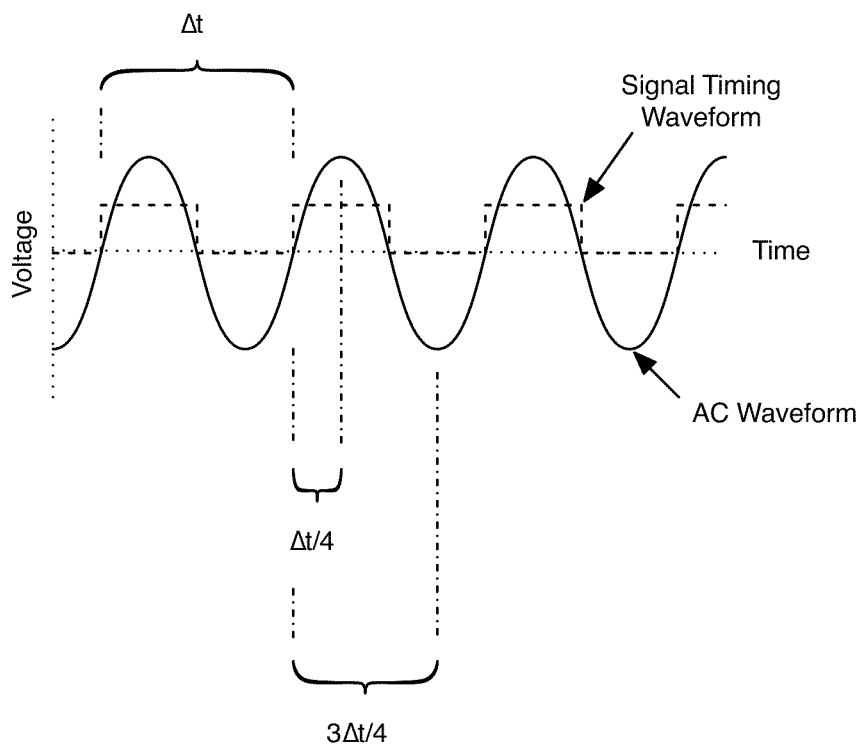
FIG. 3B is a waveform illustrating one embodiment of signal measurement timing.

One embodiment of the use of the system to measure peak-to-peak amplitude is as follows. FIG. 3B illustrates one embodiment of a complete cycle of an AC power signal.

Given a measured tick count for a full cycle ($\Delta t$), the measured signal amplitude maximum occurs at time $$\left(\frac{\Delta t}{4}\right)$$

and the minimum at time $$\left(3 \cdot \frac{\Delta t}{4}\right).$$

By triggering signal measurements at the minimum and maximum points along the signal curve, peak-to-peak amplitude can be measured while leaving the system largely in a low power state. This minimizes distortion of the measured power signal by the digital circuitry of the power control device itself, and reduces power consumption.

At the one-quarter-cycle moment $$\left(\frac{\Delta t}{4}\right),$$

the output value of the differential amplifier block 320 is read. The value is recorded as the amplitude maximum. At the three-quarter-cycle moment $$\left(3 \cdot \frac{\Delta t}{4}\right),$$

the output value of the differential amplifier block 320 is read again. The value is then recorded as the amplitude minimum. The difference between the two values, minimum and maximum, determines the peak-to-peak signal amplitude for the current cycle.

The peak-to-peak signal amplitude is recorded. This record is maintained over time in one embodiment, and is used as a reference comparison for cycle-to-cycle amplitude changes. In one embodiment, the peak-to-peak signal amplitude is only maintained for the past one cycle, to provide a point of comparison. The change state is then recorded, and the newly measured amplitude replaces the previously stored value.

In one embodiment, a comparison is made between the measured peak-to-peak amplitude for the most recent cycle and recorded peak-to-peak amplitude for the previous cycle, to determine if the signal is changing. Because no measurement circuit is perfect, rather than detect literal change, in one embodiment the system checks change against a minimum threshold. The threshold can be a pre-determined fixed value, a derived value such as percentage of the peak-to-peak amplitude, as illustrated in FIG. 6C. In one embodiment, the threshold is 5% of the observed amplitude. In one embodiment, the threshold is 5% of the 340 Volt nominal peak-to-peak amplitude ($2\sqrt{2} \cdot V_{RMS}$, where $V_{RMS}$ is 120 volts), e.g. 17 volts.

The signal amplitude is expected to change during periods of ramp-up (when measured devices are powered on), periods of discharge (when measured devices are powered down), and periods of drift (when measured devices charge and discharge). However, the system is designed to detect variations in the signal amplitude due to the usage of the device. Therefore, in one embodiment the system is designed to detect momentary increases and decreases in amplitude rather than unidirectional changes. In one embodiment, this is achieved by increasing a positive change counter and a negative change counter for each increase or decrease in amplitude beyond a given threshold, respectively. This is described in more detail below.

Those skilled in the art will recognize that the implementation of the differential amplifier block, which amplifies power fluctuations across the shunt and which provides the output signal to be measured, can introduce phase delays in the output signal. These phase delays will cause the timing of the signal thread to be out of phase with the actual source signal. If significant and not properly considered, this phase shift could lead to mistimed and inaccurate measurements.

Despite an almost guaranteed presence, a phase delay is likely to have a constant value, determined by the type of filtration and amplification used in the differential amplifier block. It is therefore a knowable value. As such, it can be corrected. In one embodiment, the correction is made by introducing a fixed adjustment to the measurement timing. Given a known phase shift p, as measured in timer counts, the timing for the first measurement becomes $$\frac{\Delta t}{4} + p$$

and the timing for the second measurement becomes $$3 \cdot \frac{\Delta t}{4} + p.$$

Provided that the timer is programmed at a frequency of sufficient resolution, the effects of phase delay caused by differential amplification can be minimized or even eliminated.

For reasons of simplicity, the preferred implementation, as illustrated in the logic flows, aligns power actuation with the zero-voltage crossing event of the supplied power source. However, actual physical components such as magnetic relays contain inherent delays between time of actuation and response. Those skilled in the art will recognize that additional timing coordination, similar to that used to trigger signal measurement, can be added to perform actuation at a given time prior to the zero-voltage crossing event. If the resolution of the timer thread is sufficiently high to approximate the inherent delay of the physical component being triggered, the timing can be altered using an offset to correct for the delay of the physical device. In one embodiment, the resolution of the timer thread may be selected to be sufficiently high to enable timing adjustments for the delay associated with the relay, and the phase delays which may impact the amplitude measurements.

FIG. 4A illustrates one embodiment of circuit diagram for a DC rectifier regulator which may be used with the variance sensing signal controller of FIG. 3A. The rectifier-regulator circuit, in one embodiment, is capable of powering a digital microcontroller and supplying it with a digital timing waveform, synchronized with the supplied power.

High voltage AC power source 410 is converted to a lower voltage, reasonably steady state power source, suitable for digital components. Additionally, the rectifier-regulator provides a digital output timing waveform, which can be used to synchronize logic to the timing of the power source signal.

The resistor-capacitor series combination 420, 425 acts as a low-loss current limiter. The resistor limits the inrush current into the capacitor as well as across diode 440. The combined impedance of resistor 420 and reactance across capacitor 425 limits the total current according the equation:

$$I = \frac{V}{R + \left(\frac{1}{2\pi f C}\right)}$$

where:

I is instantaneous current

V is amplitude of AC voltage 410 f is frequency of AC voltage 410

R is resistance of resistor 420

C is capacitance of capacitor 425

Thus, instantaneous current/is proportional to AC voltage, of amplitude V and frequency f, by the ratio of impedance determined by resistance R and capacitance C. The value for resistor 420 should be chosen in order to balance inrush current limitation with minimal heat dissipation. The value for capacitor 425 should be chosen so as to allow sufficient current to power the digital section of the intended application. In one embodiment, resistor 420 is 470 Ohms and capacitor 425 is 0.33 micro-Farads.

Resistor 430 provides a dissipative pathway to capacitor 425 and helps to filter electromagnetic interference caused by the oscillation of the capacitor 425. Resistor 430 should be chosen to provide appropriate filtration given the value of capacitor 425 and the characteristics of supplied power 410. In one embodiment, resistor 430 is 100 kilo-Ohms.

Zener diode 440 limits the output voltage to a range suitable for digital circuitry and its value should be chosen given the voltage requirements of the digital components in the application. Zener diode 440 should be selected to ensure that it can withstand a maximum current limited only by resistor 420. In one embodiment, zener diode 440 is 5.6 Volts.

The combination of diode 450 and zener diode 440 acts as a half-wave rectifier while capacitor 460 reduces the ripple in the rectified output, caused by polarity oscillations in AC power source 410. The voltage across the terminals of capacitor 460 approximates a low-voltage DC power source and, in one embodiment, is used to supply power to the digital circuitry in the application. Capacitance of capacitor 460 should be high enough to minimize ripple to levels acceptable for the intended application. In one embodiment, capacitor 460 is 560 micro-Farads.

Resistor 470 provides a current limited direct tap to supplied power 410. Clamping diodes 480 bind the low current output of resistor 470 within digital voltage limits as determined by zener diode 440. Resistor 470 is selected to be sufficiently large to produce the minimal current necessary to influence the voltage between clamping diodes 480. In one embodiment, resistor 470 is 1 mega-Ohm.

The output signal 490 is a square wave timing signal in phase with supplied power 410. Output signal 490 may be used by the digital circuitry for timing and alignment purposes.

Figure 4B:
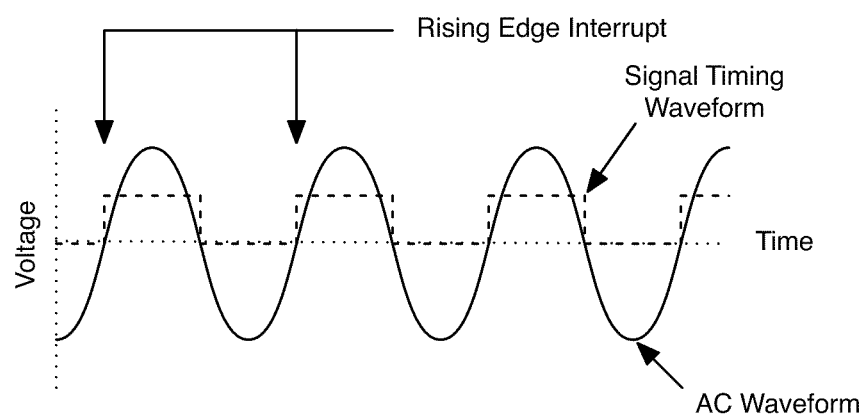
FIG. 4B is a waveform diagram illustrating one embodiment of signal timing, using the waveform output of the rectifier-regulator.

Output signal 490 provides a timing trigger for the digital microcontroller (not shown) aligned with the waveform of the power source. The timing trigger is used to take measurements of the power source at the appropriate times (e.g. at the minimum or maximum amplitude). By programming a microcontroller to trigger an interrupt on the rising edge of the signal timing square wave output 490 from the rectifier-regulator 360, as illustrated in FIG. 4B, logic executing in the microcontroller can be time-synchronized with the supplied power source. In one embodiment, the falling edge of the signal time square wave is used. In one embodiment, both edges are used.

Figures 5A, 5B, 5C:
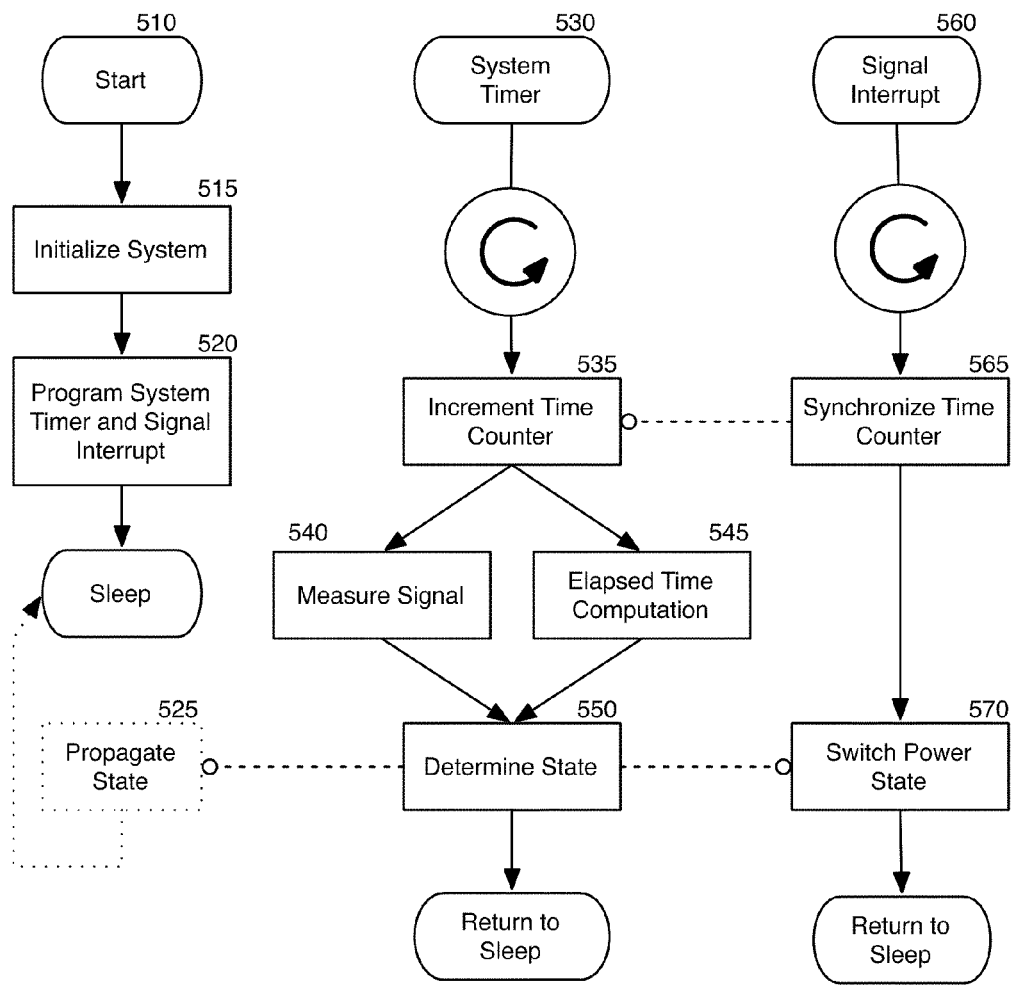
FIGS. 5A-C are flowcharts discussing the coordinated logic threads for the variance sensing signal controller.

FIGS. 5A-C illustrates an overview flowchart discussing the coordinated logic threads for the variance sensing signal controller, in one embodiment of the implementation. The coordination occurs, in one embodiment, as a consequence of the exchange of values between the timer thread (FIG. 5B) and signal thread (FIG. 5C). Because these threads can be interrupt-driven, a multitasking operating system is not required for implementation. However, a multitasking system can be used in one embodiment.

The purpose of the system thread (FIG. 5A) is, following system start 510, to initialize the system hardware (microcontroller and peripherals) (block 515) and the system variables (block 520) to a starting state. In one embodiment, the starting state requires all counters zeroed out, and no base assumptions set.

After this, in one embodiment the system thread remains largely asleep in order to minimize power consumption and avoid introducing unwanted noise into the measured power consumption signal. Depending on the particular implementation, in some embodiments the system thread can perform a number of other duties, as illustrated by optional block 525, such as propagating state. In one embodiment, the system thread propagates state to user interface elements, such as indicator LEDs. In one embodiment, the system thread propagates state wirelessly. In one embodiment the system thread checks inputs, such as interface buttons. These functions, however, are optional. In one embodiment, if such functions are implemented within the system thread, the system thread is triggered by interrupts and remains largely asleep.

The timer thread (FIG. 5B) and signal thread (FIG. 5C) in one embodiment contain the logic to implement the signal variance sensing power controller.

The timer thread (FIG. 5B) is responsible for providing a stable timing signal, which is used for event triggering and time measurement. The frequency of the system timer 530, in one embodiment, is an order of magnitude greater than the frequency of the signal interrupt. For a North American implementation, the signal interrupt 560 will occur at a 60 Hz frequency. Thus in one embodiment the system timer 530 frequency is a minimum of 600 Hz.

In one embodiment, the timer is used to adjust for the delay introduced by the use of a relay, and for phase delay, as described above. Therefore, in one embodiment, the frequency of the system timer is set to accommodate the expected values of the phase delay and relay activation delay.

In one embodiment, the timer thread increments a time counter (block 535), which counts ticks as time elapses. In one embodiment, the system timer 530 is an independent clock signal. The independent clock signal may be a hardware clock. In one embodiment, the frequency of the clock signal is 600 Hz. In another embodiment, another multiple of 60 Hz is used.

The independent signal thread (FIG. 5C) synchronizes the time counter to the phase signal of the supplied power (block 565) and thereby coordinates the number of ticks per phase with the timer thread. The coordination of these two threads, in essence, measures the frequency of the power signal in units of timer ticks and effectively aligns the timing of the power signal with that of the timer.

Returning to the timer thread (FIG. 5B), given a tick count for a complete phase of the power signal, timing values for the peak maximum and peak minimum portions of the measured power consumption signal are determined (blocks 540 and 545). Based on this, the state of the system can be determined (block 550). In one embodiment, the state of the system is sent to the signal thread (FIG. 5C) and used to trigger a switch in the power state (block 570) when appropriate. In this way, the two threads interact to provide measurements at the proper intervals to evaluate the device state, and provide data to control the signal variance sensing power controller. In one implementation, the state of the system is sent to the system thread (FIG. 5A) and used to drive optional output (block 525).

The system described above, in one embodiment, is used to detect fluctuations in the power consumption signal indicating the state of the device coupled to the sensing outlet. These elements are described in more detail below.

Figure 6A:
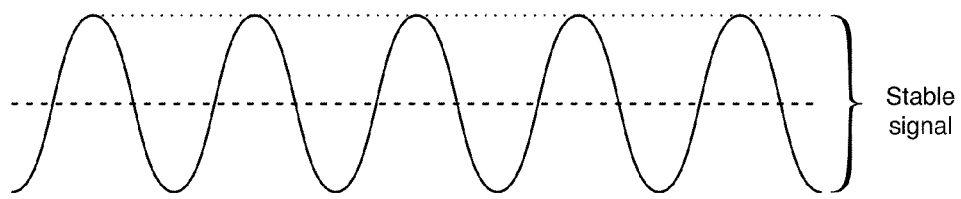
FIG. 6A illustrates a waveform showing a generalized AC power signal influenced by an ideal attached load, such as an incandescent light bulb.

FIG. 6A illustrates a waveform showing a generalized alternating current (AC) power signal influenced by an ideal attached load, such as an incandescent light bulb. The current drawn by the load is proportional to the voltage supplying it and the frequency of the signal matches that of the supplied power. For loads attached to North American household power, the measured signal will be sinusoidal with a 60 Hz frequency and amplitude proportional to power consumed. While this power basis will be used in the below figures and discussion, one of skill in the art would understand that this can be easily translated to various other AC power signals.

Most modern devices contain switching power supplies and are thus far from ideal. Consequently, the resulting signal will not be perfectly sinusoidal. However, even if the shape of the signal is not quite sinusoidal, the amplitude of the signal is still proportional to the amount of power consumed by the device.

Furthermore, most devices, including laptop computers, as they are being charged but not used, exhibit fairly stable signal amplitude characteristics. The amplitude for charging laptops may vary slowly over time, as the level of charge in the laptop battery changes. However, over relatively brief periods of time, on the order of several minutes, the signal appears stable.

Figure 6B:
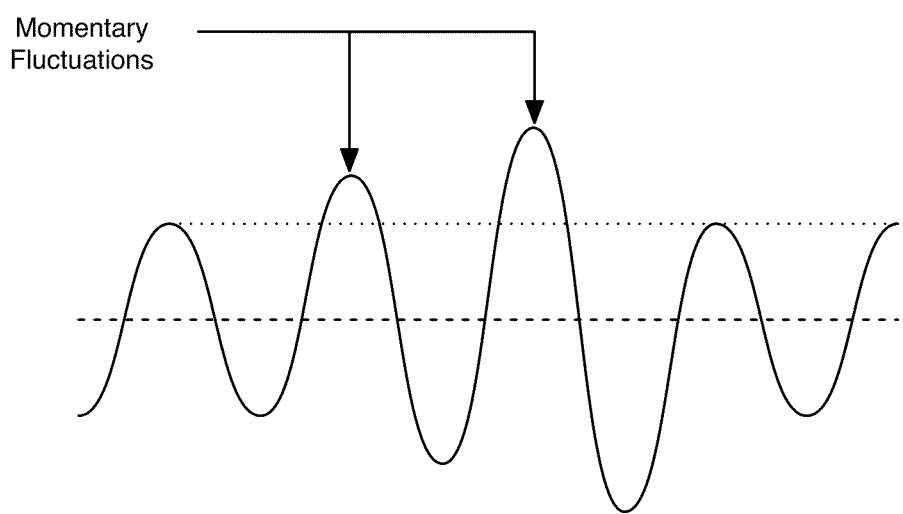
FIG. 6B illustrates a waveform showing exemplary measured power consumption signal of a personal computer or laptop while in use.
Figure 6C:
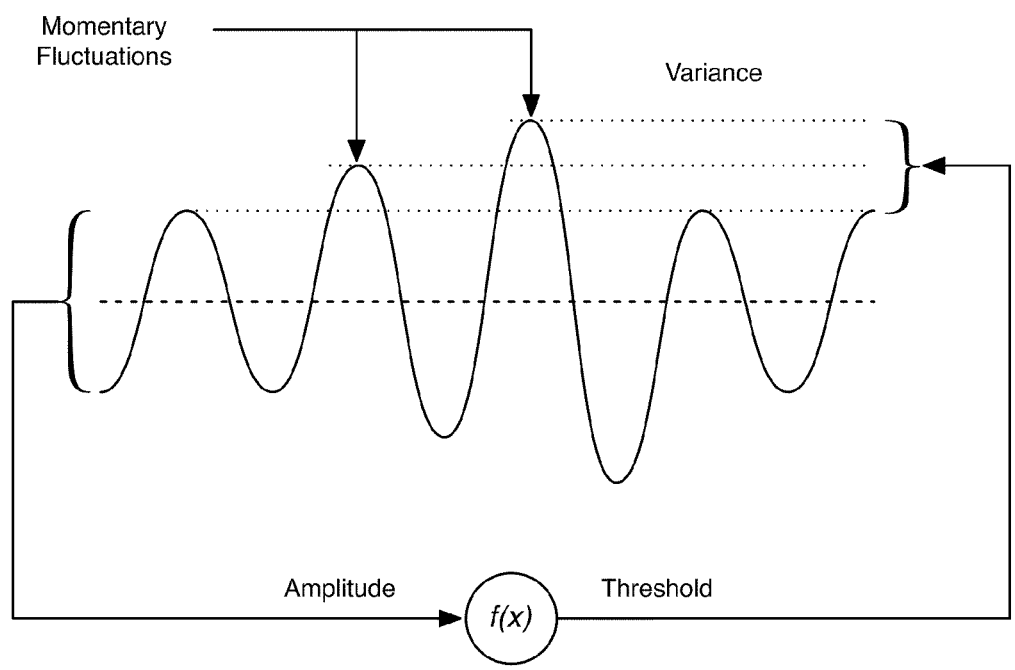
FIG. 6C illustrates exemplary derivation of variance threshold from a measured power consumption signal.

Devices exhibit a rather different power consumption profile while in use. FIG. 6B illustrates a waveform showing an exemplary power consumption signal of a personal computer or laptop while in use. Due to the multitasking nature of modern operating systems, software processes periodically wake up and return to rest as needed. As a consequence, demand on the central processing unit (CPU) and related peripheral hardware increases as processes wake up and require attention and decreases as processes return to rest. Small, short duration fluctuations occur in the signal from time to time, in response to increased process activity. These fluctuations can be seen as minor amplitude variations in the otherwise stable signal, as shown in FIG. 6B.

These power fluctuations are used to differentiate the operating modes of the attached appliance. Table 1 summarizes exemplary power characteristics of a generalized rechargeable appliance, such as a laptop computer. As can be seen, power consumption varies across modes of operation and can change over time during a single mode of operation. However, power fluctuations due to multitasking activity only occur during use.

TABLE 1

| Rechargeable Appliance Power Consumption Characteristics | | | |
|---|---|---|---|
| Mode | Charging | Power Consumption | Stability |
| Off | No | None | Stable |
| Off | Yes | Decreasing over time | Stable |

TABLE 1-continued

| Rechargeable Appliance Power Consumption Characteristics | | | |
|---|---|---|---|
| Mode | Charging | Power Consumption | Stability |
| Standby | No | Level | Stable |
| Standby | Yes | Decreasing over time | Stable |
| In Use | No | Level | Fluctuating |
| In Use | Yes | Decreasing over time | Fluctuating |

The proposed method detects minor fluctuations in the power consumption signal of the device to identify the usage state of the device.

These momentary power fluctuations induced by an attached load are detected in one embodiment by the variance sensing signal controller described above with respect to FIGS. 1-3. In one embodiment, a microcontroller is used to make periodic timed measurements, using a timing signal generated from the supplied power source and a timing signal independent of the power source. Proper coordination of these timing signals through logic allows for low-noise signal measurement as well as for time analysis of the signal in order to differentiate between stable and fluctuating power demands by the appliance. One embodiment of the process is described below.

Figure 7:
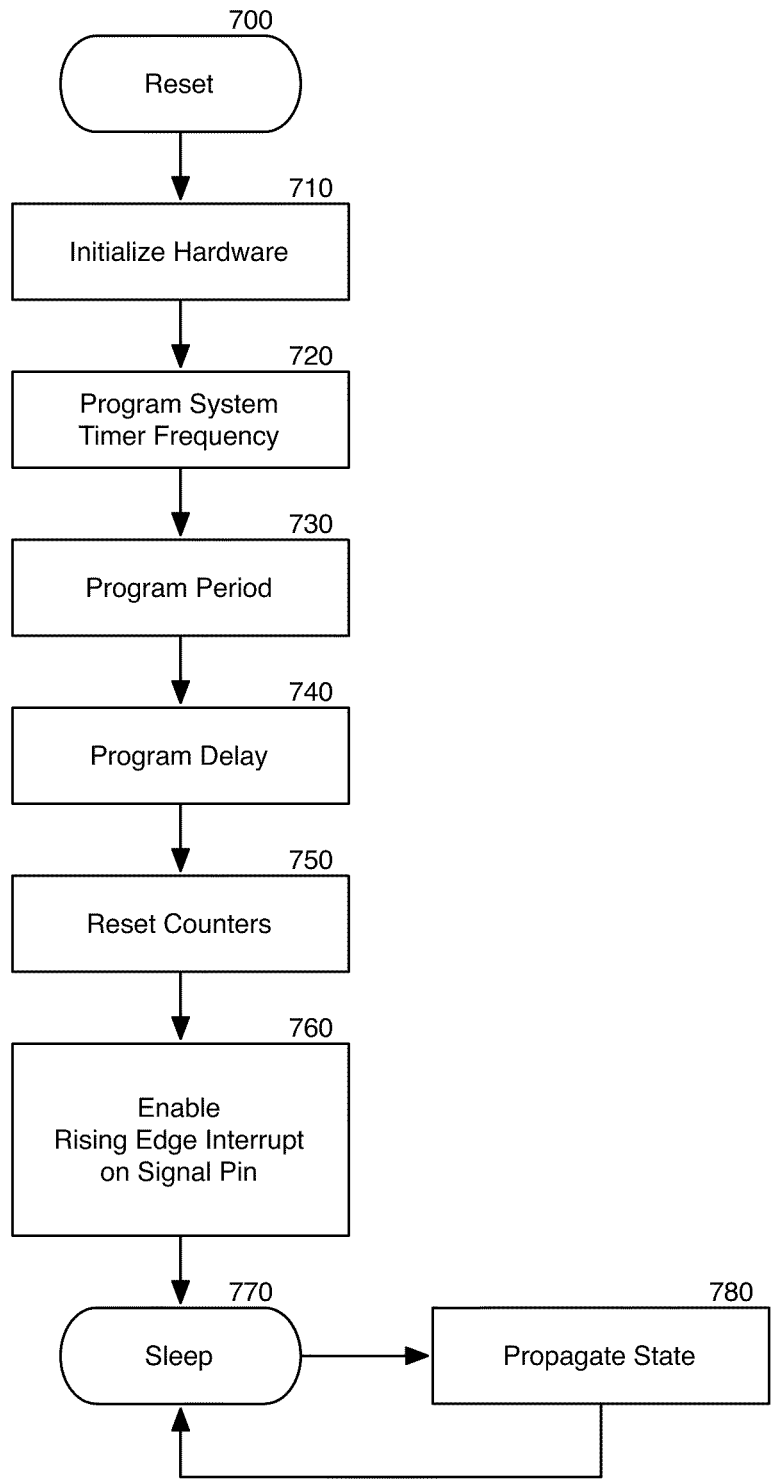
FIG. 7 is a flowchart of one embodiment of an initialization sequence.

FIG. 7 is a flowchart of one embodiment of an initialization sequence. In one embodiment, the initialization (block 700) occurs every time the variance sensing power controller is plugged in. In another embodiment, initialization only occurs the first time the power controller is plugged in. In yet another embodiment, initialization occurs whenever an appliance is inserted into the sensing outlet.

In one embodiment, the hardware is initialized (block 710). Initialization, in one embodiment, sets the hardware to the preferred operating state. In one embodiment, this includes setting up the microcontroller, as well as any integrated or attached peripherals, such as an A/D (analog to digital) converter.

In one embodiment, the frequency and hardware timing mechanism is programmed (block 720) to supply the periodic timer interrupt, which invokes the timer thread. The timer hardware can be programmed but, in one embodiment, does not need to be activated at initialization. In one embodiment, the timing mechanism may be programmed based on observed power characteristics, e.g. 60 Hz in the US v. 50 Hz in Europe.

Next the system thread programs the variance detection period (block 730) as well as the state change response delay (block 740). These values can be pre-determined or selectable by user input. In one embodiment, input may be through a computer system, coupled to the variance sensing power controller via a direct connection (USB, mini-USB, Firewire, etc.), wireless connection (WiFi, Bluetooth, etc.), or another connection, or through direct input such as a button, dial, or other user interface feature. In one embodiment, the values are recorded in a non-volatile memory. In one embodiment the values may be set to default values at every initialization.

In addition to setting the period and delay values, the system thread also resets the various counters used by the timer and signal threads (block 750). These counters are described in detail in below.

Finally, the system thread programs and enables a rising-edge interrupt triggered by the power signal timing waveform provided by the regulator-rectifier circuit (block 760). In one embodiment, both rising and falling edge interrupt triggers are enabled. After this, in one embodiment the system thread can go to sleep (block 770). This reduces the power consumption of the system.

Optionally, the system thread can be re-awoken from sleep (block 770) and propagate state, drive additional outputs and/ or monitor additional inputs (block 780). Once inputs are read and outputs written, the system thread can return to sleep (block 770). In one embodiment, the system thread propagates state information wirelessly. In one embodiment, the system thread outputs state information to indicator LEDs. In one embodiment, the system thread reads user input (e.g. buttons). These functions are not described in detail, but those skilled in the art will understand their use, and how they can be added. Note that care should be taken not to introduce unnecessary power consumption or induce unwanted signal noise by adding excess functionality to the system thread.

Figure 8:
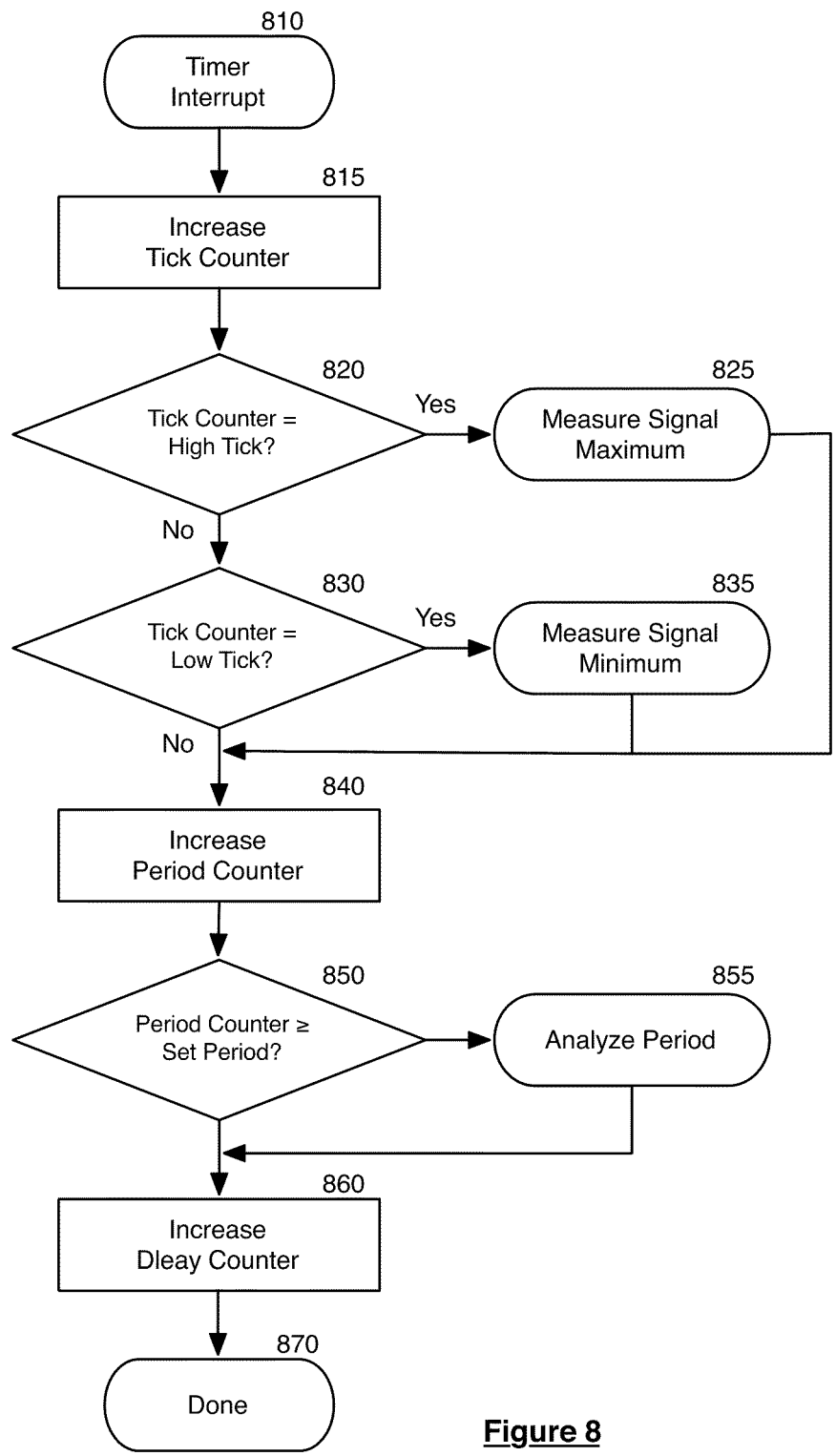
FIG. 8 is a flowchart of one embodiment of a timer thread which may be used.

FIG. 8 is a flowchart of one embodiment of the timer thread, which may be used. In one embodiment, the timer thread is an interrupt driven periodic timer thread, which performs a combination of time related processes. In one embodiment, these duties may include one or more of: time slicing the measured signal frequency, initiating signal measurements at the quarter cycle and three-quarter cycle time positions, determining elapsed time, performing periodic analysis, and enforcing delays.

At every timer interrupt (block 810), the timer thread increases the tick counter (block 815). The tick counter is asynchronously reset by a signal interrupt thread at the start of each signal cycle, in one embodiment. This means that the value of the tick counter will increase from 0 to a consistent non-zero value t during each complete signal cycle. The value of the tick counter thus represents the time position within the signal cycle.

In one embodiment, two values, the high tick and the low tick, are used by the system. The high tick corresponds to the tick count at the maximum amplitude, while the low tick is the tick count at the minimum amplitude. These values are calculated based on the value of the tick counter at the end of each signal cycle. In one embodiment, these values may be calculated by the asynchronous signal thread, described in more detail below.

In one embodiment, the system is set so that the high tick is logically true at the quarter-cycle, and the low tick at the three-quarter-cycle of the AC signal. This timing ensures that the measurement takes place at the correct position in the signal waveform, e.g. at the minimum and maximum. In one embodiment, the tick count is adjusted to account for the phase shift/delay associated with triggering and taking the measurement. Alternative tick counts may be used. While using peak-to-peak measurement simplifies calculations, one of skill in the art would understand that other measurements may be used, e.g. peak to mid-cycle (zero), etc.

The timer thread compares the tick counter to these values (blocks 820, 830) and, if equal, initiates the appropriate signal measurement (blocks 825, 835). In one embodiment, when the signal interrupt occurs on the rising edge of the signal waveform, the high tick marks the signal amplitude maximum, and the low tick marks the signal amplitude minimum.

By performing measurements when peak amplitude values occur, in one embodiment, the system minimizes the computational power used to compute signal amplitude for each signal cycle. Furthermore, the implementation avoids excessive noise introduced by continuous measurement and computation.

Those skilled in the art will realize that, for a given application, it may be advantageous to perform additional measurements at specific times during a signal cycle. In one implementation, additional measurements are taken at the one-eighth cycle and the five-eighths cycle points to determine additional signal characteristics (e.g. noise or shape).

After increasing the tick counter and initiating signal measurements, the timer thread increases the period counter (block 840). The period counter is used to define a period after which the data is analyzed. As noted, this process is initiated by a timer interrupt. Thus the period counter tracks the number of timer interrupts.

The period counter is compared against an elapsed period value (block 850) and, if equal, a period analysis is initiated (block 855). The period analysis is described in more detail below. In one embodiment, when period analysis is initiated (block 855) the process also resets the period counter.

Finally, the timer thread increases the delay counter (block 860), which can be used by other threads. For instance, in one embodiment, the signal thread uses the delay counter to determine whether the measured signal has been stable for a given length of time. In one embodiment, the delay counter is reset by the period analysis logic (discussed below with respect to FIG. 10) when the state of the device coupled to the sensing outlet changes. Thus, the delay counter measures the ticks since the last state change.

Once the timer thread has completed its tasks (block 870), it returns to sleep, in one embodiment. Because it is triggered by the timer interrupt, it will be re-activated at the next timer event. Thus, in one embodiment, the timer thread is used to ensure that the maximum signal amplitude measurement is performed at the quarter-cycle moment and minimum amplitude at the three-quarter-cycle moment. In one embodiment, the timer thread is used to ensure that additional measurements are made at precise moments during a signal cycle.

Figures 9A, 9B:
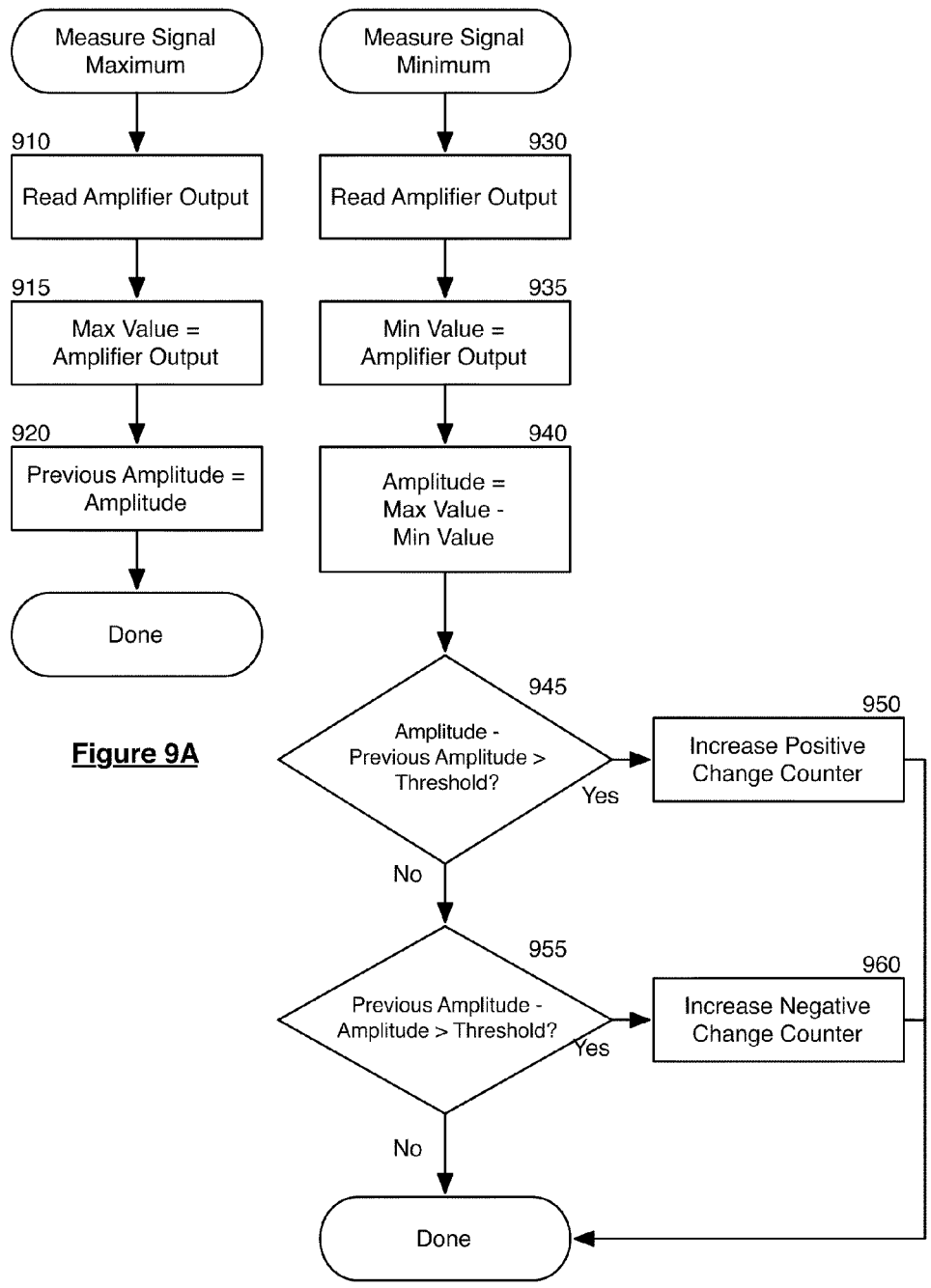
FIGS. 9A-B are flowcharts of one embodiment of measuring signal maximum and minimums.

FIGS. 9A and B are flowcharts of one embodiment of the signal amplitude measurements. FIG. 9A is a flowchart of one embodiment of measuring signal maximum, while FIG. 9B is a flowchart of one embodiment of measuring signal minimum.

The signal maximum measurement, FIG. 9A, is triggered by the timer thread. At the one-quarter-cycle moment, the output value of the differential amplifier block is read (block 910). The value is then recorded as the amplitude maximum (block 915).

In one embodiment, a record is made of any previously computed peak-to-peak amplitude (block 920). This recorded value is used as a reference comparison for cycle-to-cycle amplitude changes. In one embodiment, the previously computed amplitude is stored as a numeric value. In one embodiment, two amplitude measurements are stored, the currently measured value and the previously measured value.

FIG. 9B, the minimum measurement, is also triggered by the timer thread. At the three-quarter-cycle moment, the output value of the differential amplifier block is read (block 930). The value is then recorded as the amplitude minimum (block 935). Because the maximum amplitude for the current cycle was previously measured, the difference between the two values, minimum and maximum, determines the peak-to-peak signal amplitude for the current cycle. The peak-to-peak signal amplitude is calculated (block 940).

In one embodiment, the measurement process is simplified by triggering a single amplitude measurement, either maximum or minimum, and utilizing the half amplitude value for calculations. This simplification reduces the frequency of measurement interrupts by half but also reduces the sensitivity by half. In one embodiment, additional measurements are taken during the signal cycle.

Using the just-calculated amplitude for the current cycle and the recorded peak-to-peak amplitude for the previous cycle, a comparison is made to determine if the signal is changing (block 945, 955). Because no measurement circuit is perfect, rather than detect literal change, in one embodiment the change is compared to a minimum threshold. The threshold can be a pre-determined fixed value or can be derived as a percentage of the peak-to-peak amplitude.

The system calculates whether there is a positive change. If the current amplitude is greater than the previous amplitude by more than a threshold value (block 945), the positive change is counted, and the positive change counter is incremented (block 950). The system also determines if there is a negative change. If the current amplitude is less than the previous amplitude by more than a threshold value (block 955), the negative change counter is incremented (955). The process then ends.

In certain applications, it may be advantageous to only count those changes that happen within a particular time of a prior change (e.g. to ignore changes that happen farther apart in time from one another than a given time interval). In one embodiment, a change which occurs after a given time interval from the last detected change is ignored. In one embodiment, this is only done for changes in the opposite direction. Such a change rejection logic may be included between blocks 945 and 950 of FIG. 9 to record period count (refer to block 840 of timer thread in FIG. 8) and additional checking logic between blocks 955 and 960 of FIG. 9 to check the period count against the recorded value before proceeding to block 960. In one embodiment, delay logic 250 in FIG. 2 may be used to implement this checking, in conjunction with variability analysis 245.

Figure 10:
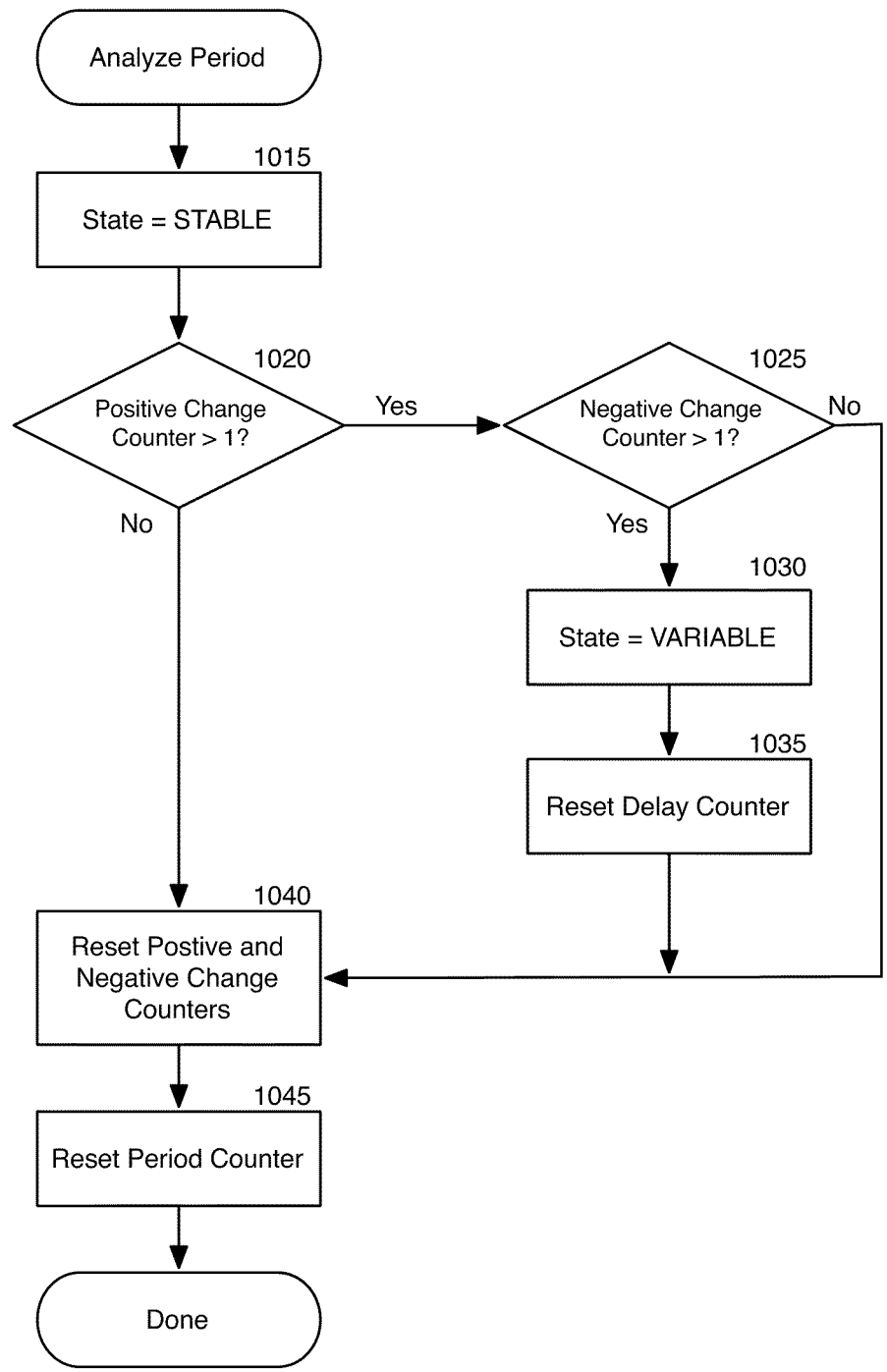
FIG. 10 is a flowchart of one embodiment of variability analysis.

FIG. 10 is a flowchart of one embodiment of the variability analysis. In one embodiment, this process is triggered by the timer thread, as shown in block 850. In one embodiment, at the end if each period, the period analysis is used to analyze variability.

The period is first assumed to be stable and the state is set to stable (block 1015).

The positive change and negative change counters are checked against a given value (block 1020). The given value is selected based on the length of the evaluation period, and the preferred conditions of the intended application. In one embodiment, the given value is one, e.g. a single change in either the positive or negative direction. In one embodiment, the given value for both change counters is identical. A value greater than 1 in both the positive and negative change counters indicates that a power fluctuation of duration greater than a single waveform cycle (greater than 17 ms for North America) has occurred during the evaluated period. In one embodiment, the given value is at least one for the positive and at least one for the negative change, to eliminate the identification of a steady decrease or increase in amplitude as a fluctuation. In one embodiment, at least one positive and one negative change must be detected within a limited period of time for the system to identify a fluctuation. In other words, if the time difference between the +1 and the −1 occurrence is greater than a limit, the −1 (or +1) is not included in determining whether there was a signal fluctuation.

If both change counters are above the given value (i.e. a fluctuation has been detected), the state is set to variable (block 1030). In one embodiment, in addition to checking the value of the positive and negative change counters, the system also checks the combined value of the positive and negative change counters. In one embodiment, the combined value of the positive and negative change counters should be greater than five in order to set the state to variable (block 1030).

In one embodiment the delay counter is reset (block 1035). By resetting the delay counter whenever variability is encountered during an evaluation period, the system is able to determine consistent periods of stability. The value of the delay counter indicates the length of time the measured signal has been consistently stable, as expressed in units of delay counts. The process then continues to block 1040.

During evaluations where positive and negative counters are not above the given value, the process continues directly from block 1020 to block 1040, skipping blocks 1025 through 1035. The state remains set to stable and the delay counter is allowed to increment.

In block 1040, the analysis logic resets the positive and negative counters in preparation for the next analysis cycle, since they have been used for state evaluation at this point. In one embodiment the period counter is also reset (block 1045).

Figure 11:
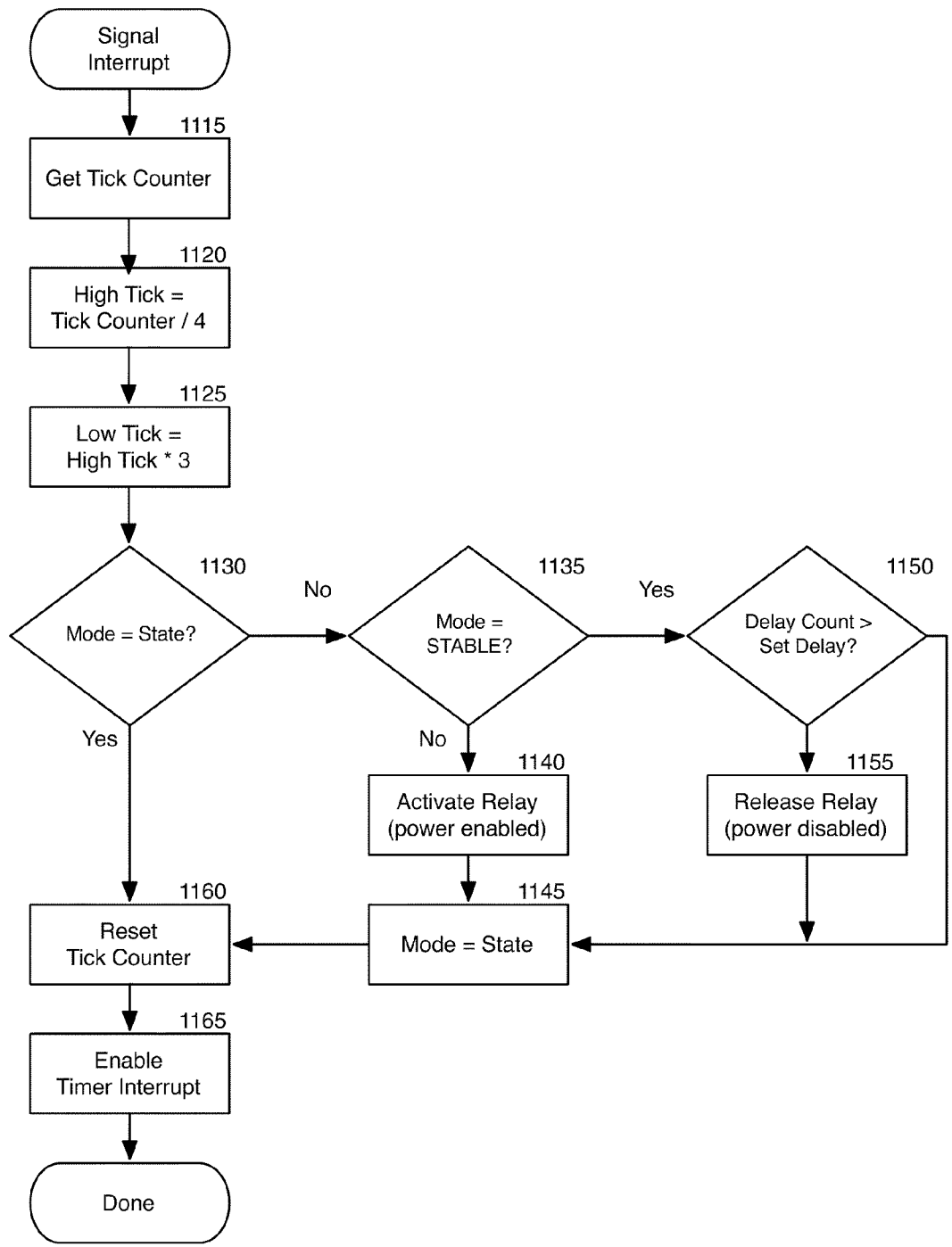
FIG. 11 is a flowchart of one embodiment of a signal thread used to provide precise timing for measurements.

FIG. 11 shows one embodiment of the details of the timing of the signal measurement. In one embodiment, the interrupt driven signal thread is the mechanism through which the timing analysis and measurements performed by the timer thread are synchronized and coordinated with both supplied power and the measured signal. This example assumes that the signal thread has been configured to trigger at the rising edge of the timing waveform, in one embodiment, produced by the rectifier-regulator block (an example of which is shown in FIG. 3A, block 360).

In one embodiment, the signal thread is initiated at the rising edge of the zero-voltage crossing. Thus, it occurs precisely at end of each signal waveform cycle and the start of the next full cycle. By retrieving the value of the tick counter (block 1115), the signal thread can determine the number of timer ticks per full cycle. The tick counter is asynchronously incremented by the timer thread, as described above. The tick count is then used by the signal thread to determine the quarter-cycle and three-quarter cycle tick counts (block 1120), which it records in the high tick and low tick values (block 1125). The timer thread, as discussed earlier, uses these values to trigger measurements at the appropriate times.

The asynchronous coordination between the timer and signal threads forms the basis, in one embodiment, for both low-noise and precise measurement. Precise measurement timing has the added benefit of reducing computation necessary to determine peak-to-peak signal amplitude. Additionally, because the signal thread is triggered in step with the start of each full cycle in the power source, in one embodiment, it is the logical place to perform controlled outlet power activation and deactivation of the controlled outlet, the secondary device, or any other controlled feature. At the start of each cycle, the voltage across the power supply is zero and controlled outlets can be powered or de-powered safely.

After computing the high and low tick counter values, the signal thread checks whether the state, as determined by the timer thread, matches the actual operating mode (block 1130).

If they differ, the thread performs the computations to determine whether a change to the operating mode and a resulting power change action is appropriate, by determining whether the mode is Stable (block 1135). The mode is Stable if no variations have been detected.

If the mode is not Stable, the relay is activated to power the controlled outlet(s) (block 1140) and the state is set to active. When variability is detected, the logic returns to an active state and engages the relay providing power to the controlled outlet(s). This logic pattern means that the power is removed from the associated devices only after a given period of stability (.e.g. lack of use), and the power is returned to move the controlled outlet to active mode quickly once variability is detected. In one embodiment, the return to active mode occurs immediately after variability is detected. At this point the mode matches the state (block 1145).

If the state is Stable (block 1135) and the delay counter has increased beyond a given value (block 1150), the signal has remained stable for some time. This indicates that the device connected to the sensing outlet is not in use. The thread therefore changes the operating mode to standby and disengages the relay powering the controlled outlet(s) (block 1155). At this point, the mode matches the state (block 1145).

In one embodiment, the state controls one or more relays in blocks 1140 and 1155. In one embodiment, a control signal is issued at blocks 1140 and 1155, indicating the state. The control signal is used by the relay to disconnect, or connect, the controlled outlet(s) to power, in one embodiment. Alternatively, the relays may be replaced by other control mechanisms, which are triggered based on the state signal.

Note that even after a switch to standby, in one embodiment the logic continues to scan for variability in the signal. Because in one embodiment the delay counter is only considered during periods of stability, when variability is detected, the logic returns to an active state and re-engages the relay providing power to the controlled outlet(s).

Because the signal thread and the timer thread are asynchronous in the preferred implementation, the signal thread establishes coordination between the two threads. In one embodiment, this is performed very simply by resetting the tick counter (block 1160) after completing the evaluation.

In one embodiment, further synchronization can be achieved by enabling the timer thread from within the signal thread (block 1165). As noted above with respect to FIG. 7, the initialization sequence programs the timer and leaves in an inactive state, in one embodiment. Activating the timer from within the signal thread closely aligns the timing of both threads. This extra alignment is useful but not necessary, and those skilled in the art will recognize that it is particularly beneficial if the timer frequency is a close integer multiple of the signal frequency. In this way the signal thread logic interacts with the timer thread, and provides the decisioning for connecting and disconnecting the slave outlet(s). The signal thread logic relies on the determination of whether the mode is stable. Stability is determined based on a variability analysis, one embodiment of which is described above with respect to FIG. 10.

Although the proposed implementation describes a mechanism with both a variance sensing first outlet and power controlled second outlet(s), many alternative implementations are possible, while employing the proposed method. For example, a variance-sensing outlet could be used to drive an indicator or to send a wireless command signal. Slave outlets or even devices with built-in receivers could be designed to respond to the determined mode. Furthermore, the mode could be used to drive more than simply related peripherals. For instance, mode detection could be used to control task lighting or even environmental conditions.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of reducing power consumption by a secondary device related to a primary device, the method comprising:
measuring a first amplitude at a first time;
measuring a second amplitude at a second time;
calculating a fluctuation in power consumption by the primary device based on a comparison of the first amplitude and the second amplitude, the fluctuation indicating changes in process activity;
determining a state of the primary device based on the fluctuations in the power consumption over time; and
influencing power consumption of the secondary device based on the state of the primary device to reduce power consumption of the secondary device.

2. The method of claim 1, wherein measuring the fluctuation in the power consumption comprises:
measuring the power signal at one or more times during an AC power cycle; and
comparing the measured value to a baseline to determine the fluctuation in the power consumption.

3. The method of claim 2, wherein the one or more times comprises one or more of: a minimum amplitude, a maximum amplitude, periodic intervals during the AC power cycle.

4. The method of claim 2, wherein comparing the measured value to the baseline additionally comprises determining whether the comparison should be considered a change based on fluctuation criteria.

5. The method of claim 4, wherein the fluctuation criteria comprises a change threshold, and the change threshold is one of: a fixed value, or a value calculated based on the signal amplitude.

6. The method of claim 4, wherein the fluctuation criteria comprises a timing threshold.

7. The method of claim 2, wherein the measured value used for comparison comprises: an amplitude of the signal, a slope of the signal, or a characteristic signal shape, and wherein the baseline comprises: a measured prior value or an ideal value of the amplitude, slope, or characteristic signal shape.

8. The method of claim 1, wherein influencing the second device comprises providing and removing power supplied to the secondary device, to reduce the power consumption of the secondary device when the primary device is not active.

9. The method of claim 1, wherein influencing the secondary device comprises signaling the second device.

10. A method comprising:
a timer thread to:
increment a time counter;
measure the amplitude at the time counter interval;
determine a fluctuation in power consumption associated with a primary device at a time counter interval, the fluctuation calculated based on a difference between the measured amplitudes;
determine device state of the primary device based on the fluctuation;
a signal thread to:
synchronize the time counter with an alternating current (AC) power input to perform the measurement;
influence a related device based on the device state of the primary device.

11. A variance sensing controller comprising:
variability analysis to determine whether fluctuations in an alternating current signal to which a primary device is coupled indicates that the primary device is in use, the fluctuations calculated by comparing a first amplitude measurement to a second amplitude measurement of the alternating current signal, the fluctuations indicating process activity; and state logic to change a setting when the variability analysis logic determines that the state of the primary device has changed.

12. The controller of claim 11, further comprising:

measurement logic to measure the signal at one or more positions in an AC power cycle.

13. The controller of claim 12, wherein the one or more positions comprise one or more of: a minimum amplitude, a maximum amplitude, and periodic intervals during the AC power cycle.

14. The controller of claim 12, further comprising:

a comparison logic to compare a measured value with a baseline, to determine whether the measured signal indicates a change in the power consumption.

15. The controller of claim 14, wherein the measured value used for comparison comprises: an amplitude of the signal, a slope of the signal, or a characteristic signal shape, and wherein the baseline comprises: a measured prior value or an ideal value of the amplitude, slope, or characteristic signal shape.

16. The controller of claim 14, wherein the change comprises a positive change, a negative change, or no change.

17. The controller of claim 14, wherein the variability analysis is based on a measurement of at least one positive change, and at least one negative change in the amplitude of the signal.

18. The controller of claim 14, further comprising:

a change rejection logic to reject the change when the change does not meet fluctuation criteria.

19. The controller of claim 18, wherein the fluctuation criteria is a change threshold comprising one of: a set value, and a value based on a percentage of the measured alternating current signal.

20. The controller of claim 18, wherein the fluctuation criteria is elapsed time.

21. The controller of claim 11, further comprising:

a related device controller which is connected or disconnected based on the state, as determined by the state logic.

22. The controller of claim 11, further comprising:

a state propagator which sends a signal reflecting the state determined by the state logic.

* * * * *